United States Patent [19]

Atkins

[11] Patent Number: 5,230,497
[45] Date of Patent: Jul. 27, 1993

[54] MULTIPLE STATE VALVE

[75] Inventor: Roger L. Atkins, Salt Lake City, Utah

[73] Assignee: Bunnell Incorporated, Salt Lake City, Utah

[21] Appl. No.: 698,705

[22] Filed: May 10, 1991

[51] Int. Cl.⁵ .............................................. F16K 7/06
[52] U.S. Cl. ............................................... 251/9; 251/7
[58] Field of Search ....................... 251/4, 6, 7, 9, 10

[56] References Cited

U.S. PATENT DOCUMENTS

| | | | |
|---|---|---|---|
| 2,791,239 | 5/1957 | Mason | 251/9 X |
| 3,511,469 | 5/1970 | Bell | 251/7 |
| 4,061,142 | 12/1977 | Tuttle | 251/9 X |
| 4,176,671 | 12/1979 | Citrin | 251/7 X |
| 4,518,145 | 5/1985 | Keltz et al. | 251/7 X |

Primary Examiner—Martin P. Schwadron
Assistant Examiner—Kevin L. Lee
Attorney, Agent, or Firm—Thorpe North & Western

[57] ABSTRACT

A multiple state pinch valve selectively controls the flow rate of fluid flowing within a flexible, resilient pinch tube. The valve includes a housing, and two biased pivot arm pinchers pivotally mounted in the housing on opposite sides of the pinch tube. Two springs bias respective ones of the pivot arm pinchers toward one another to pinch the tube, and two electromagnetic force field generators are mounted in the housing to selectively attract respective pivot arms away from one another to thereby selectively release some of the pinching of the tube.

9 Claims, 2 Drawing Sheets

MULTIPLE STATE VALVE

BACKGROUND

1. Field of the Invention

This invention relates generally to valves, and more specifically to a multi-state pinch valve for controlling fluid flow through a conduit.

Prior Art

Valves typically utilize a sliding, rotating or other friction producing part to open, close or partially close a channel through which fluid flows. Consequently, such valves tend to heat up with use, thus altering the tolerances of the valves and the manner in which they operate. While this may be acceptable in many or even most uses for valves, it can be a problem for precisely engineered systems which employ valves, since consistency and predictability of operation of the system and its components may be vital. Another problem with valves which use sliding, rotating, etc., parts, is that they tend to wear out more rapidly with frequent use.

A further problem with many conventional valves arises in the context of medical or drug delivery systems. In these situations it is oftentimes necessary that the valves used be essentially noncontaminating. Ideally the valve parts should not contact (and contaminate) the fluid whose flow is being controlled by the valve.

One prior art valve which addresses and partially solves the problems discussed above is described in U.S. Pat. No. 4,501,405. The valve described includes a flexible and resilient tube for carrying a fluid, and an electrically energizable coil for producing an electromagnetic force when energized, a magnetically attractable element, and a leaf spring for holding the magnetically attractable element. The valve has only two positions---opened and closed. When the electromagnetic coil is energized, the magnetically attractable element is attracted toward the coil, the tube is pinched to close the valve, and when the coil is de-energized, the element is moved away from the coil by the leaf spring to release the tube and open the valve. Valves similar to that above described are also discussed in U.S. Pat. Nos. 4,471,773 and 4,538,604.

As indicated above, the valve of U.S. Pat. No. 4,501,405 is a two-position valve, being either open or closed. There is a need, however, for a control valve having the features of the valve of the '405 patent but also having the capability of controlling the flow rate of fluid at levels between full flow and no flow. Such a need is shown in copending U.S. patent application, Ser. No. 07/698,297, filed May 10, 1991.

BRIEF SUMMARY AND OBJECTS OF THE INVENTION

It is a principal object of the instant invention to provide an improved, low friction producing multi-state valve.

It is another principal object of the invention to provide a valve capable of varying the amount of fluid allowed to flow therethrough in a simple and efficient manner.

It is also an object of the invention to provide a valve which is simple to construct and service.

It is a further object of the invention to provide a valve which is reliable and long lived.

It is an additional object of the invention to provide such a valve in which multiple flow rates through the valve may be manually selectable.

The above and other objects of the invention are realized in a specific illustrative embodiment of a multiple state pinch valve comprising a flexible and resilient tube for carrying a fluid, first and second pincher elements, each disposed on a different side of the tube in opposing relationship, and a first motive activator for selectively moving the first pincher element between first and second positions toward and away from the second pincher element to pinch the tube against the second pincher element by first and second degrees respectively to thereby allow the flow of fluid through the tube at first and second rates respectively. A second motive activator is provided for selectively moving the second pincher element between third and fourth positions toward and away from the first pincher means to pinch the tube against the first pincher means by third and fourth degrees respectively to thereby allow the flow of fluid through the tube at third and fourth rates respectively.

In accordance with one aspect of the invention, set screws are provided and positioned to limit the movement of the pincher elements to thereby define the positions between which the pincher elements may move. Said screws may be manually varied to thereby vary the pincher element positions.

This valve is particularly useful in the system of the aforecited co-pending patent application. Therein is disclosed a jet ventilator system for supplying positive pressure pulses of oxygen and air to ventilate a patient's respiratory system and which includes a source of gas and under pressure; a tracheal conduit, one end of which is for insertion into the mouth and throat of the patient; a jet nozzle disposed at the other end of the conduit directing gas under pressure toward the one end of the conduit; and a primary delivery conduit coupled between the source of gas and the other end of the tracheal conduit for delivering gas under pressure to the jet nozzle.

The valve of the present invention when used in the above system allows rapid transitions between four preferred different inspired gas flow rates, and therefore allows transitions between four different air way pressure values, as desired for the system.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
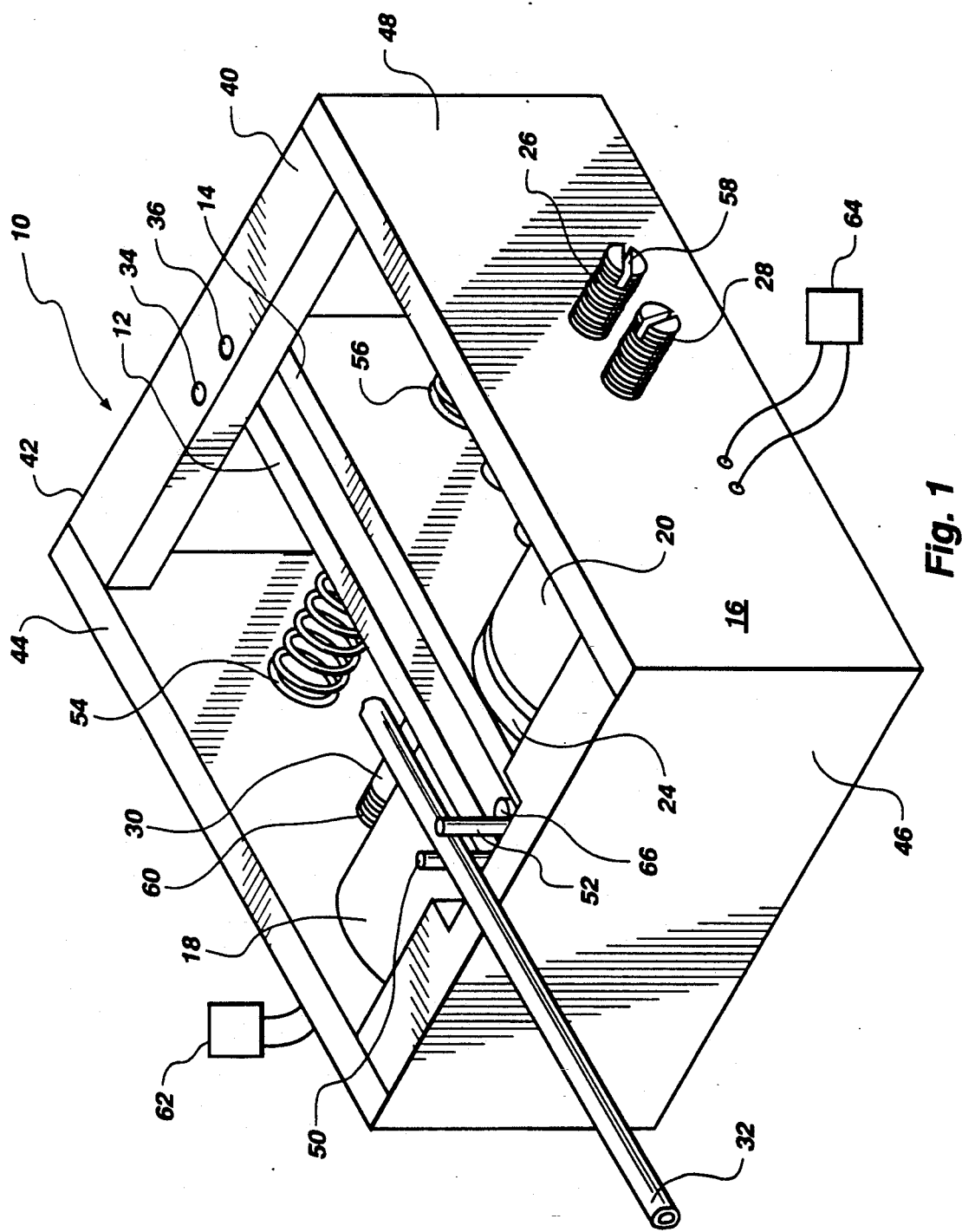
FIG. 1 is a perspective view of a preferred multi-state pinch valve, according to the present invention.
Figure 2:
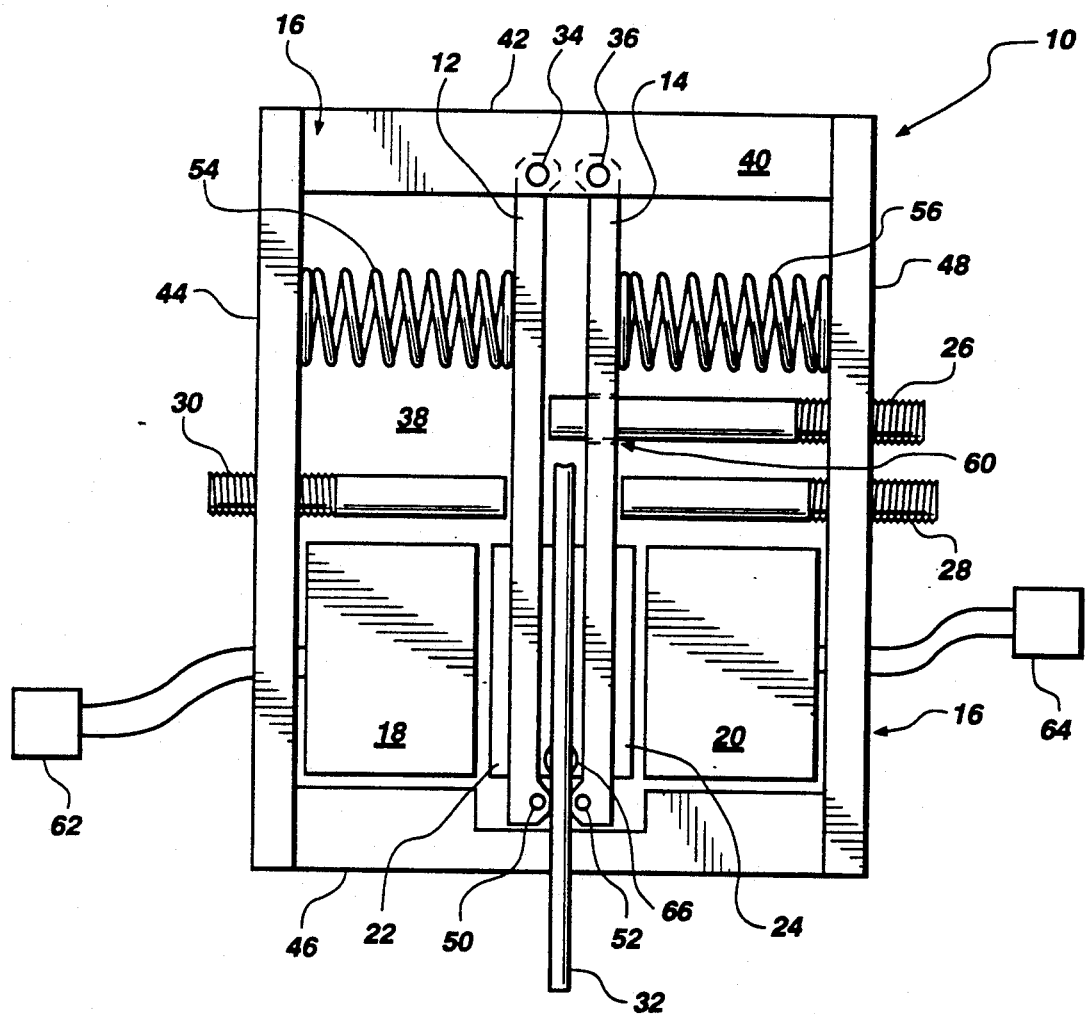
FIG. 2 is a top plan view of the valve of FIG. 1.

Reference is now made to the drawings wherein like numerals are used to designate like components throughout. As shown in FIGS. 1 and 2, the valve of the present invention, generally designated 10, includes a pair of elongate pivot arms (pinchers) 112 and 14 pivotally mounted at one end in a housing 16, two electromagnetic field generators or coils 18 and 20, two magnetically attractable elements 22 and 24 mounted on respective pivot arms 12 and 14, three adjustable control set screws 26, 28 and 30 mounted in the housing to contact selected pivot arms, and a pinch tube 32 through which the fluid to be controlled flows. Each of these components is described hereinafter in greater detail.

As mentioned, pivot arm pinchers 12 and 14 are pivotally mounted in housing 16 by means of two pivot screws 34 and 36, both of which are anchored at one end through a bottom wall 38 of the housing 16, and at the other end through a brace 40 disposed opposite the bottom wall 38.

The housing 16 comprises generally four broad sidewalls 42, 44, 46, and 48. Pivot arm pinchers 12 and 14 extend longitudinally the length of the housing 16 from the pivot screws 34 and 36 to terminate adjacent the opposing sidewall 46. Each pivot arm pincher 12 and 14 includes at its unattached end raised tube pincher bars 50 and 52, respectively, which extend vertically upwardly to contact the pinch tube 32 on opposite sides thereof in opposing relationship.

As best shown in FIG. 2, each pivot arm pincher 12 and 14 has a magnetically attractable (ferromagnetic) element 22 and 24, respectively, rigidly mounted to its outward facing longitudinal side. Also, each pivot arm pincher 12 and 14 is inwardly biased toward one another by coil springs 54 and 56, respectively. Springs 54 and 56 are each attached at one end to a respective outside broad face of a pivot arm pincher 12 and 14 and attached at the other end thereof to a sidewall 44 or 48 of the housing 16.

Adjustable control screws 26, 28 and 30 are used to maintain pivot arm pinchers 12 and 14 in preset positions to allow for a variable flow rate of the fluid flowing through the pinch tube 32. As best seen in FIG. 2, each screw is made adjustable by being threaded at one end, the threads being matched with corresponding threaded apertures, not shown, formed in sidewalls 44 and 48 of housing 16. FIG. 1 shows that the threaded ends of screws 26, 28, and 30 include slots such as slot 58, for receiving a flathead screwdriver or similar tool having a flat edged surface. Insertion of such a tool into a slot of a control screw and rotation thereof, will adjust the point at which the control screw contacts a respective pivot arm pincher 12 or 14.

FIG. 2 shows a preferred configuration of control screws 26, 28 and 30, although it should be recognized that other configurations may also be used. In the preferred configuration, control screw 26 extends through an aperture 60 in pivot arm pincher 14 such that the end thereof rests adjacent pivot arm pincher 12. Control screw 28 is disposed so as to have an end positioned adjacent the outwardly facing surface of pivot arm pincher 14. Control screw 30 is disposed opposite that of pivot screw 28 so as to have an end positioned adjacent the outwardly facing surface of pivot arm pincher 12.

Electromagnetic field generators 18 and 20 are conventional electromagnetic coils wound in the form of a cylinder. Each coil 18 and 20 is coupled to separately actuated electric current sources 62 and 64, respectively, (which, in turn, could be controlled by a single control unit such as a microprocessor) and, when current is supplied to the coils from the current sources 62 and 64, the coils produce an electromagnetic force field to attract the elements 22 and 24. Thus, the electromagnetic field generators 18 and 20, selectively energized and de-energized by the electric current sources 62 and 64, move the pivot arm pinchers 12 and 14, respectively.

The pinch tube 32 is preferably flexible, resilient and made, for example, of rubber, styrene, butydene, chloroprene, or other similar resilient material. The tube 32 is used to carry fluid whose flow is to be controlled, i.e. stopped, slowed, released, etc. As shown, the pinch tube 32 is disposed between the two raised tube pincher bars 50 and 52 attached to pivot arm pinchers 12 and 14, respectively.

The preferred embodiment of the control screws 26, 28, and 30, described above, allows for separation between pivot arm pinchers 12 and 14 to be controlled at four different values. The resistance to fluid flow through the pinched tube 32 is dependent on separation between pinchers 12 and 14. When used in connection with the jet ventilation system, disclosed in applicant's co-pending patent application Ser. No. 07/698,297, one of the pivot arm pinchers 12 is used to deliver ventilation at conventional rates, while the other pincher 14 is used to deliver high frequency ventilation pulses.

When both coils 18 and 20 are de-energized, the springs 54 and 56 position the (conventional) pincher 12 against the control screw 26 and the (high frequency) pivot arm pincher 14 against a fixed center stop 66 disposed between pinchers 12 and 14. In this state, adjustment of the position of the control screw 26 determines the fluid flow rate through the valve and, therefore, the resulting pressure. It will be readily apparent to one skilled in the art that adjustment of control screw 26, with both coils 18 and 20 de-energized, can result in complete blockage of flow through pinch tube 32.

When coil 18 is energized and coil 20 is de-energized, the (conventional) pincher 12 is attracted toward and against the control screw 30 while the (high frequency) pincher 14 remains against the fixed center stop 66. In this state, adjustment of the control screw 30 determines the resulting pressure.

When coil 18 is de-energized and coil 20 is energized, the (conventional) pincher 12 is positioned against the control screw 26 while the (high frequency) pincher 14 is attracted toward and against the control screw 28. In this state, adjustment of the position of the control screw 28 determines the resulting pressure.

When both coils 18 and 20 are energized, then the (conventional) pincher 12 is positioned against the control screw 30 and the (high frequency) ventilation pincher 14 is positioned against the control screw 28 In this state, the resulting pressure is determined by the combination setting of the two control screws 28 and 30. Also, in this state, one skilled in the art will recognize that the greatest amount of fluid is allowed to flow through pinch tube 32. Thus, when used with the jet ventilation system of the aforecited co-pending patent application, through independent energization of the two coils 18 and 20, it is possible to produce ventilation at conventional rates, high frequency rates or ventilation in a combined conventional and high frequency mode.

It will be apparent that the pinch valve of the present invention is suitable for virtually any application in which a pinch valve is contemplated. This valve may be used to control the flow of most any fluid which can be contained within a resilient tube, whether in a gaseous or liquid state, since no part of the valve comes in contact with the controlled fluid. Thus, this valve is ideally suited for use with fluids which must remains sterile, for example, the jet ventilation system mentioned above, as well as fluids which are corrosive or otherwise harmful.

It is to be understood that the above described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

We claim:

1. A multi-state valve comprising
a flexible and resilient tube for carrying a fluid,
first and second pincher means, each disposed on a different side of the tube in opposing relationship and moveable toward and away from the tube,
first moving means for selectively moving the first pincher means between first and second positions toward and away from the second pincher means to pinch the tube against the second pincher means by first and second degrees respectively to thereby allow the flow of fluid through the tube at first and second rates respectively,
second moving means for selectively moving the second pincher means between third and fourth positions toward and away from the first pincher means to pinch the tube against the first pincher means by third and fourth degrees respectively to thereby allow the flow of fluid through the tube at third and fourth rates respectively,
first stop means for stopping movement of the first pincher means in the first position as it moves toward the second pincher means, wherein said first stop means may be selectively adjusted to thereby vary the first position to which the first pincher means is moved, and
second stop means for stopping movement of the first pincher means in the second position as it moves away from the second pincher means, wherein said second stop means may be selectively adjusted to thereby vary the second position to which the first pincher means is moved.

2. A valve as in claim 1 further including third stop means for stopping movement of the second pincher means in the third position as it moves toward the first pincher means, and fourth stop means for stopping movement of the second pincher means in the fourth position as it moves away from the first pincher means.

3. A valve as in claim 1 wherein at least the third or fourth stop means is adjustable to vary the third or fourth position between which the second pincher means is moved.

4. A valve as in claim 2 wherein said first and second pincher means each includes a magnetically attractable element, and wherein said first and second moving means comprise
first and second biasing means respectively for biasing the first and second pincher means toward the first and third positions respectively, and
first and second electromagnetic force generating means respectively for selectively attracting respective magnetically attractable elements of the first and second pincher means to thereby attract the first and second pincher means toward the second and fourth positions respectively.

5. A valve as in claim 4 further including a housing, and wherein said first and second pincher means each comprises an elongate bar, one end of which is pivotally mounted in the housing so that the other end is moveable toward and away from the other bar between respective positions.

6. A valve as in claim 5 wherein said first and second biasing means each comprises a resilient coil spring.

7. A valve as in claim 5 wherein said first and second pincher means each further comprises a pincher member extending from the other end of the bar for contacting and pinching the tube.

8. A valve as in claim 5 wherein said housing includes at least one threaded opening, and wherein at least one of said stop means comprises a shank, one end of which is threaded for screwing into the opening so that the other end thereof is disposed in proximity to one of the bars to contact the bar and stop further movement thereof as the bar is moved toward the shank, the position of stopping said one bar being variable by screwing or unscrewing the shank in the opening.

9. A pinch valve for selectively varying the flow rate of fluid through a flexible, resilient tube comprising
first and second moveable pincher means disposed on opposite sides of the tube in opposing relationship to pinch the tube,
first bias means for biasing the first pincher means to a first pinching position against the tube,
second bias means for biasing the second pincher means to a second pinching position against the tube,
first force means for attracting the first pincher means from the first pinching position away from the second pincher means to a third pinching position, when energized,
second force means for attracting the second pincher means from the second pinching position away from the first pincher means to a fourth pinching position, when energized,
means for selectively energizing the first and second force means to enable production of four different flow rates resulting from (a) the first pincher means being in the first position and the second pincher means being in the second position, (b) the first pincher means being in the first position and the second pincher means being in the fourth position, (c) the first pincher means being in the third position and the second pincher means being in the second position, and (d) the first pincher means being in the third position and the second pincher means being in the fourth position, and
a plurality of stop means for stopping movement of the first and second pincher means in the first and third pinching positions, and the second and fourth pinching positions respectively.

* * * * *